United States Patent
Trebesius et al.

(10) Patent No.: US 9,810,603 B2
(45) Date of Patent: Nov. 7, 2017

(54) METHOD AND DEVICE FOR DETECTING GLOW IGNITION OF AN INTERNAL COMBUSTION ENGINE IN A MOTOR VEHICLE

(71) Applicant: Volkswagen Aktiengesellschaft, Wolfsburg (DE)

(72) Inventors: Samuel Trebesius, Wahrenholz (DE); Stefan Klie, Braunschweig (DE); Andreas Sprysch, Edemissen (DE); Stefanie Thauer, Gifhorn (DE); Florian Thauer, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 236 days.

(21) Appl. No.: 14/440,506

(22) PCT Filed: Oct. 23, 2013

(86) PCT No.: PCT/EP2013/072120
§ 371 (c)(1),
(2) Date: May 4, 2015

(87) PCT Pub. No.: WO2014/067821
PCT Pub. Date: May 8, 2014

(65) Prior Publication Data
US 2015/0308924 A1    Oct. 29, 2015

(30) Foreign Application Priority Data
Nov. 2, 2012   (DE) ......................... 10 2012 021 517

(51) Int. Cl.
*G01M 15/04*   (2006.01)
*G01M 15/11*   (2006.01)
(Continued)

(52) U.S. Cl.
CPC ............ *G01M 15/11* (2013.01); *F02D 35/02* (2013.01); *F02D 35/027* (2013.01);
(Continued)

(58) Field of Classification Search
USPC .............................. 73/114.03, 114.08, 114.62
See application file for complete search history.

(56) References Cited

U.S. PATENT DOCUMENTS 7,899,608 B1 * 3/2011 Pederson ............... G01M 15/11
701/111
2006/0000264 A1   1/2006 Kim
(Continued)

FOREIGN PATENT DOCUMENTS

DE   41 38 765 A1   7/1992
DE   195 44 720 C1   3/1997
(Continued)

OTHER PUBLICATIONS

Münzinger S., et.al.: "The Pre-Ignition Phenomenon: Causes, Emergence and Avoidance," Das Phänomen Glühzündung—Ursachen, Entstehung and Vermeidung—MTZ worldwide, vol. 63, Nov. 2002.
(Continued)

*Primary Examiner* — Eric S McCall
(74) *Attorney, Agent, or Firm* — Pearl Cohen Zedek Latzer Baratz LLP

(57) ABSTRACT

A method for detecting glow ignition of a fuel-air mixture in a combustion chamber of an internal combustion engine having at least one first cylinder and at least one second cylinder, the at least one first and second cylinders being connected by a crankshaft, according to which method partial segment times of the at least one first cylinder are measured. The method is characterized in that partial segment times of the at least one second cylinder are measured and a reference characteristic for the glow ignition is formed
(Continued)

by a comparison of partial segment times of the at least one first cylinder with partial segment times of the at least one second cylinder and subsequently a signal is generated for the detection of the glow ignition on the basis of the comparison.

10 Claims, 2 Drawing Sheets

(51) Int. Cl.
*F02D 41/00* (2006.01)
*F02D 41/14* (2006.01)
*F02D 41/22* (2006.01)
*F02D 35/02* (2006.01)
*G01L 23/22* (2006.01)
*F02P 5/152* (2006.01)

(52) U.S. Cl.
CPC ..... *F02D 41/0097* (2013.01); *F02D 41/1473* (2013.01); *F02D 41/1497* (2013.01); *F02D 41/22* (2013.01); *F02P 5/152* (2013.01); *G01L 23/225* (2013.01); *G01M 15/046* (2013.01); *Y02T 10/40* (2013.01)

(56) References Cited

U.S. PATENT DOCUMENTS

| | | |
|---|---|---|
| 2006/0047405 A1 | 3/2006 | Bouchain et al. |
| 2008/0289602 A1 | 11/2008 | Haug et al. |
| 2010/0206125 A1 | 8/2010 | Heppel |
| 2010/0286891 A1* | 11/2010 | Huang ................ F02D 35/027 701/102 |
| 2010/0286894 A1 | 11/2010 | Jung et al. |

FOREIGN PATENT DOCUMENTS

| | | |
|---|---|---|
| DE | 10257686 A1 | 7/2004 |
| DE | 10 2007 024 415 B3 | 1/2009 |
| DE | 10 2008 009 071 A1 | 7/2009 |
| DE | 10 2008 017 163 B3 | 11/2009 |
| DE | 10 2009 008 247 B3 | 8/2010 |
| DE | 10 2009 021 932 A1 | 12/2010 |
| DE | 10 2011 108 307 A1 | 1/2013 |
| EP | 2256326 | 12/2010 |

OTHER PUBLICATIONS

International Search Report for PCT International Application No. PCT/EP2013/072120, dated Jan. 30, 2014.

* cited by examiner

METHOD AND DEVICE FOR DETECTING GLOW IGNITION OF AN INTERNAL COMBUSTION ENGINE IN A MOTOR VEHICLE

CROSS-REFERENCE TO RELATED APPLICATIONS

This application is a National Phase Application of PCT International Application No. PCT/EP2013/072120, International Filing Date Oct. 23, 2013, claiming priority of German Patent Application No. 10 2012 021 517.7, filed Nov. 2, 2012, which is hereby incorporated by reference in its entirety.

FIELD OF THE INVENTION

The invention relates to a method and to a device for detecting glow ignition of an internal combustion engine in a motor vehicle, according to the features of claim 1 and claim 9, respectively.

BACKGROUND OF THE INVENTION

The term "pre-ignition" refers to a process that results in an uncontrolled and premature ignition of the fuel-air mixture towards the end of the compression phase, especially in Otto engines with a high compression ratio or with supercharging, without an ignition spark having already been generated by the ignition system. A glow ignition is a special sub-type of pre-ignition that is caused by a hot component in the cylinder and that takes place without a knocking level. The rise in temperature caused by the pre-ignition or by the glow ignition, and the increase in the pressure are intensified by the fact that the compression in the combustion chamber is not yet complete. This results in extreme temperature and pressure values in the combustion chamber, which can ultimately lead to the destruction of engine components.

In order to detect the pre-ignition, normally a signal from the knocking sensor is used in order to detect the high-frequency vibrations that usually accompany the pre-ignition.

German patent specification DE 10 2007 024 415 B3 describes a method for detecting a pre-ignition of an externally ignited internal combustion engine having at least one cylinder. According to the method, the rotational speed of the crankshaft during a first time interval is measured during operation of the internal combustion engine. Moreover, a knocking signal is detected by means of a structure-borne sound sensor during a second time interval during operation of the internal combustion engine. Glow ignition of the cylinder is detected when the rotational speed of the crankshaft has slowed down relative to a comparative value and when a knocking combustion is detected on the basis of the knocking signal.

A drawback of this method is that no reliable glow ignition detection is carried out. In particular, detection methods that are based on the use of the knocking signal cannot detect glow ignition since the glow ignitions often occur without any high-frequency components.

SUMMARY OF THE INVENTION

Before this backdrop, the objective of the present invention is to allow an improved detection of glow ignition of an internal combustion engine.

This objective is achieved according to the invention by a method having the features of the claims.

According to the invention, a method is carried out for detecting glow ignition of a fuel-air mixture in the cylinder chamber of an internal combustion engine having at least a first and at least one other cylinder, which are connected to a crankshaft, whereby subsegment times of the first cylinder are measured, characterized in that the subsegment times of the at least one other cylinder are measured and a reference characteristic for the glow ignition is formed on the basis of a comparison of subsegment times of the first cylinder to subsegment times of the at least one other cylinder, and subsequently a signal for the detection of glow ignition is generated as a function of the comparison.

Advantageous refinements of the invention are put forward in the dependent claims.

An advantage of the method according to the invention lies in the fact that, by comparing the subsegment times to the subsegment times of the other cylinder, a reference characteristic is obtained, as a result of which a robustness against erroneous detections can be ensured, whereby the erroneous detections are caused by drive train vibrations. The term "segment time" refers to the time period that the crankshaft needs in order to rotate by a prescribed angle range, that is to say, by a prescribed segment. In a 6-cylinder four-stroke internal combustion engine, a cylinder segment can be, for instance, 120°. The segment time of a cylinder is the time that the crankshaft needs in order to traverse the predefined 120°. A cylinder segment can be, for example, an expansion stroke, that is to say, a combustion stroke of the appertaining cylinder in which the fuel that has been drawn in is burned. As a result, entire segment times take too long to respond sensitively to a glow ignition. An entire segment time takes too long to form an informative characteristic and to respond sensitively to a glow ignition. The effect that occurs locally around the top dead center (TDC) is distorted when entire segment times are used. This is why, according to the invention, the segment times are divided into smaller subsegment times.

The detection according to the invention can more effectively protect the internal combustion engine. Early detection of glow ignition can accelerate the initiation of the countermeasures and thus prevent the internal combustion engine from being destroyed. Moreover, the use of the subsegment times can cover the entire speed spectrum. In the high speed range, individual segment times are too noisy to be properly evaluated. This problem is solved by using several segment times.

Moreover, the method is based on sensors and actuator systems that are already present, as a result of which it can be integrated into the existing engine control unit without a need for additional hardware components.

Preference is given to an embodiment of the method in which the signal for the glow ignition can be generated independently of a knocking signal. Thus, only one characteristic is used for detecting glow ignitions, namely, a reference characteristic formed on the basis of the subsegment times. Consequently, it is not necessary to additionally use the structure-borne sound signal from the knocking sensor and to implement an escalation strategy on this basis. Therefore, glow ignitions without a high-frequency fraction can be detected and a reliable detection can be ensured.

In a preferred embodiment, the subsegments of the crankshaft can be freely selectable. Thus, it is possible to generate a criterion that has a very high selectivity when it comes to the detection of glow ignitions. Thanks to the freely selectable segment times, an adaptation can be implemented that is independent of the drive train, thereby utilizing the greatest possible potential from the signal.

According to the invention, the subsegment can be in the range of the top dead center (TDC). In most cases, the pre-ignition or the glow ignition is in the range of the top dead center (TDC). However, in a few cases, a pre-ignition can shift towards even earlier points in time relative to the TDC. The selection of the subsegment is not dependent on the position of the pressure application. Deceleration of the crankshaft is described by the energy conversion before the TDC. The more energy has previously been converted, the greater the deceleration and thus also the longer the subsegment time.

According to the invention, the glow ignition can be detected when the subsegment time of the first cylinder is lengthened by a fixed time duration as compared to the subsegment time duration of the at least one other cylinder.

According to the invention, the reference characteristic for m cylinders can be calculated by the general formula:

reference characteristic $n$=(subsegment time $n-1/(2*(m-1))*\Sigma i=n-m+1, \ldots, n-1, n+1, \ldots, n+m+1$ subsegment time$_i$)/subsegment time$_n^3$ Accordingly, the subsegment time of the current cylinder is subtracted from the mean value of the subsegment times of the other cylinders. Here, the mean value is calculated on the basis of the preceding m cylinders and the subsequent m cylinders—whereby the current cylinder is not included in the calculation of the mean value. The division with the subsegment time$^3$ is carried out in order to increase the selectivity within the scope of a heuristic approach. The sole subsegment time is subject to large fluctuations, depending on the load and rotational speed, which is why it is inadequate as the sole characteristic. For this reason, the mean value of other subsegment times is subtracted from the subsegment time in order to obtain a comparison characteristic. This mean value combines the adjacent cylinders, except for the first (current) cylinder. In case of a glow ignition, one cylinder has a markedly altered, preferably lengthened, subsegment time as compared to the others. The incorporation of the current or first cylinder into the calculation of the mean value leads to a loss of selectivity.

Normal combustions will ideally have a value of zero, that is to say, each subsegment time of all of the cylinders has the same length. In reality, in the normal case, the subsegment times fluctuate around the value of zero. In case of a glow ignition, one subsegment time is much higher than the others, and thus, as a characteristic, it is far greater than zero. In this case, the characteristics of the other cylinders will shift slightly into the negative range. Concrete value ranges are dependent on the subsegment selected, on the internal combustion engine and on the drive train (dual mass flywheel).

An internal combustion engine typically has a control unit that is responsible for controlling, regulating and monitoring engine functions. Advantageously, the method according to the invention can be stored in the memory of an engine control unit as a program-controlled function.

An especially advantageous arrangement can be that it is installed in a motor vehicle whose internal combustion engine has a control unit in whose memory the program-controlled invention is stored as a function.

The motor vehicle can be a wheeled vehicle that does not run on rails.

BRIEF DESCRIPTION OF THE DRAWINGS

Additional advantages and advantageous embodiments and refinements of the invention will be explained below on the basis of the accompanying drawings and making reference to the figures. The following is shown in detail.

DETAILED DESCRIPTION OF THE INVENTION

Figure 1:
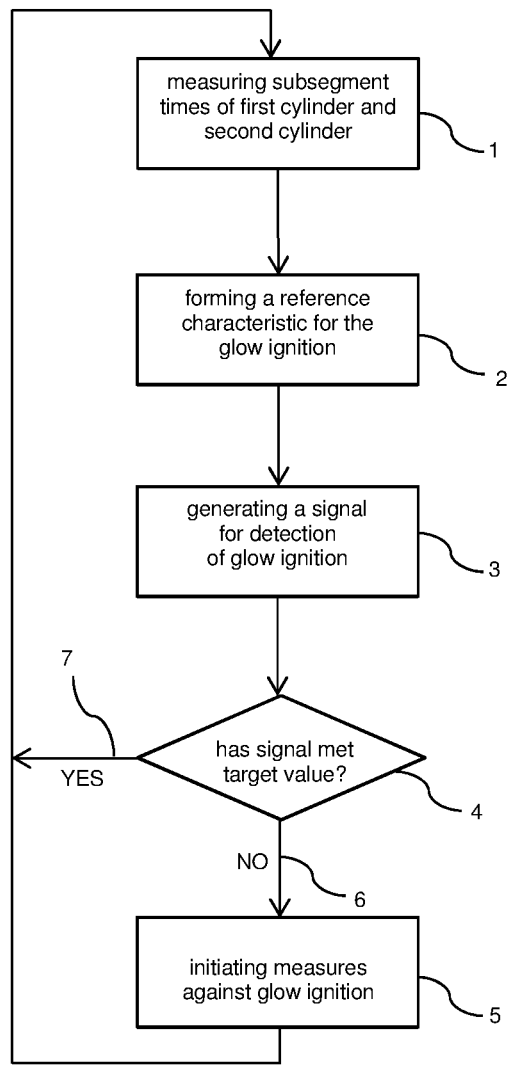
FIG. 1 is a schematic view of an embodiment of the method according to the invention.

FIG. 1 schematically shows the method according to the invention. After the measurement of the subsegment times of the first cylinder and of the at least one other cylinder 1, a reference characteristic for the glow ignition is formed 2 by means of a comparison of subsegment times of the first cylinder to subsegment times of the at least one other cylinder. Subsequently, a signal for the detection of glow ignition is generated 3 as a function of this comparison. The signal is compared 4 to the target value to ascertain the extent to which the target value has been met. If the target value 7 has been met, then the method according to the invention is carried out again. If the target value 6 has not been met, then measures are initiated 5 against the glow ignition such as, for example, an interruption of the fuel supply, a reduction of the charge pressure, a reduction of the fresh charge or a cooling of the cylinder in question. After the countermeasures 5 have been initiated, the method is carried out once again.

Figure 2:
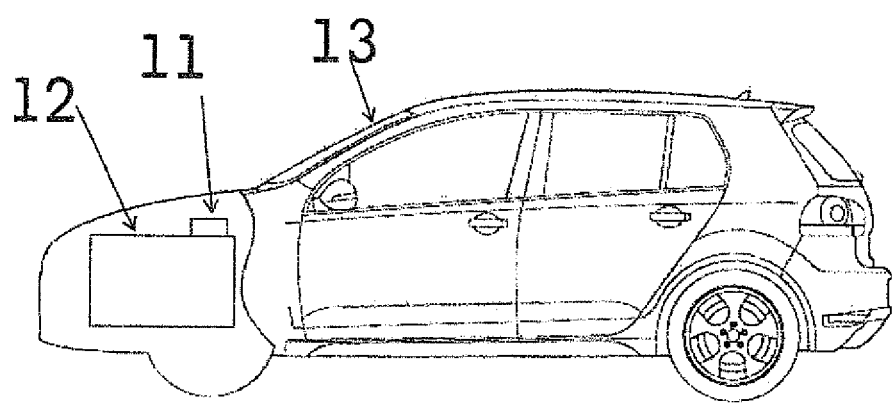
FIG. 2 is an embodiment of the vehicle according to the invention, with a method implemented as a function in the control unit.

FIG. 2 is a partially schematic view of a vehicle 13 according to the invention, with a sectional view of its front part. A control unit 11 and an internal combustion engine 12 are situated in the front part of the vehicle 13. The method according to the invention is implemented as a function in the control unit 11. Via the control unit 11, the measures by means of which ultimately the pre-ignition can be avoided are initiated on the drive train.

LIST OF REFERENCE NUMERALS 1 measurement of subsegment times
2 formation of the reference characteristic for a glow ignition
3 generation of a signal for the detection of a glow ignition
4 decision: has the target value been met?
5 measures against glow ignition
6 yes
7 no
11 engine control unit
12 internal combustion engine
13 vehicle

The invention claimed is:

1. A method for detecting a glow ignition of a fuel-air mixture in a cylinder chamber of an internal combustion engine having control unit, a first cylinder and at least one additional cylinder, the first cylinder and the at least one additional cylinder being connected to a crankshaft, said method comprising the steps of:

measuring, via the control unit, subsegment times of the first cylinder;

measuring, via the control unit, subsegment times of the at least one additional cylinder;

comparing, via the control unit, the subsegment times of the first cylinder to the subsegment times of the at least one additional cylinder, thereby forming a reference characteristic for the glow ignition as a function of the comparison; and subsequently generating, via the control unit, a signal based upon said reference characteristic, said signal corresponding to a detection of the glow ignition.

2. The method according to claim 1, wherein the signal for the glow ignition is generated independently of a knocking signal.

3. The method according to claim 1, wherein the subsegment times of the first cylinder and of the at least one additional cylinder of the crankshaft are freely selectable.

4. The method according to claim 1, wherein the subsegment times of the first cylinder and the at least one additional cylinder are in the range of a time such that the first cylinder is in a top dead center (TDC) and a time that the at least one additional cylinder is in a TDC, respectively.

5. The method according to claim 1, wherein the glow ignition is detected when the subsegment time of the first cylinder is lengthened by a fixed time duration as compared to the subsegment time of the at least one additional cylinder.

6. The method according to claim 1, wherein the reference characteristic is defined by the following formula:

$$\text{reference characteristic } n = (\text{subsegment time}_n - 1/(2*(m-1)) * \Sigma i = n-m+1, \ldots, n-1, n+1, \ldots, n+m-1 \text{ subsegment time}_i)/\text{subsegment time}_n^3,$$

wherein n is the subsegment time of the first cylinder, and m is the number of all cylinders of the internal combustion engine.

7. The method according to claim 1, wherein the reference characteristic can be zero or a number greater than zero.

8. The method according to claim 7, wherein a glow ignition is detected when the value of the reference characteristic is greater than zero.

9. A control unit comprising a memory, said memory storing a program that, when executed, performs a method comprising the steps of:

measuring, via the control unit, subsegment times of the first cylinder;

measuring, via the control unit, subsegment times of the at least one additional cylinder;

comparing, via the control unit, the subsegment times of the first cylinder to the subsegment times of the at least one additional cylinder, thereby forming a reference characteristic for the glow ignition as a function of the comparison; and subsequently generating, via the control unit, a signal based upon said reference characteristic, said signal corresponding to a detection of the glow ignition.

10. A motor vehicle having an internal combustion engine comprising a control unit having a memory, said memory storing a program that, when executed, performs a method comprising the steps of:

measuring, via the control unit, subsegment times of the first cylinder;

measuring, via the control unit, subsegment times of the at least one additional cylinder;

comparing, via the control unit, the subsegment times of the first cylinder to the subsegment times of the at least one additional cylinder, thereby forming a reference characteristic for the glow ignition as a function of the comparison; and subsequently generating, via the control unit, a signal based upon said reference characteristic, said signal corresponding to a detection of the glow ignition.

* * * * *